Feb. 19, 1935. M. THÉODORIDÉS 1,992,104
MIXING AND DISTRIBUTING COCK FOR HYDROTHERAPY
Filed Jan. 21, 1933
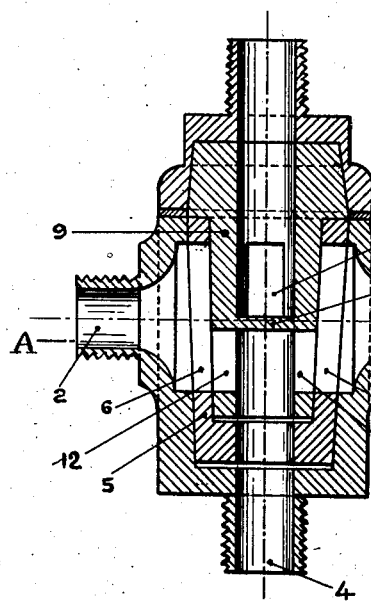
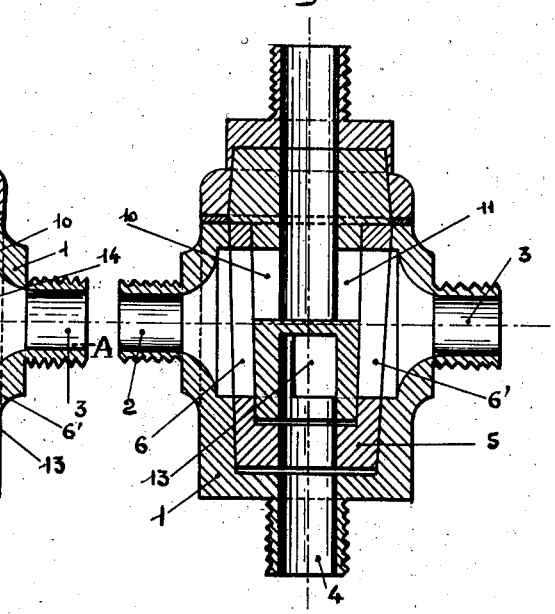
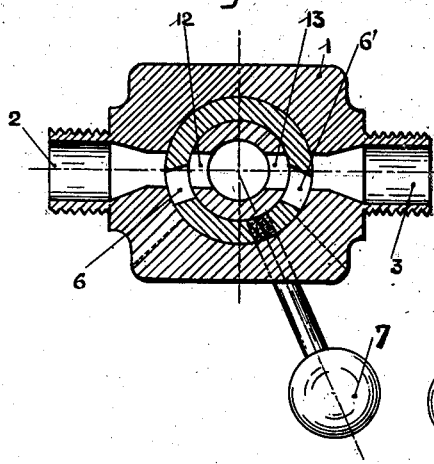
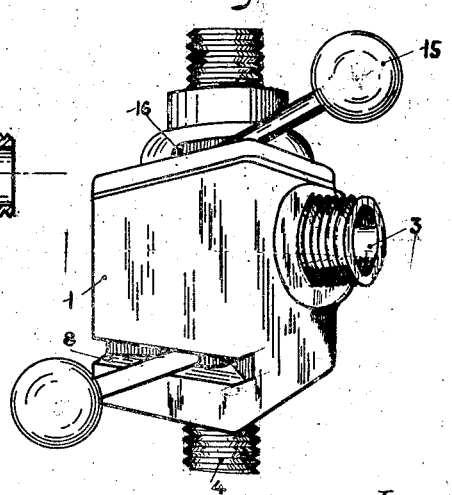
Inventor,
Michel Theodorides,
By William C. Linton
Attorney.

Patented Feb. 19, 1935

1,992,104

UNITED STATES PATENT OFFICE 1,992,104

MIXING AND DISTRIBUTING COCK FOR HYDROTHERAPY

Michel Théodoridés, Paris, France

Application January 21, 1933, Serial No. 652,895
In Germany January 25, 1932

2 Claims. (Cl. 277—41)

The invention has for its object a mixing and distributing cock for cold, hot and tempered water for hydrotherapy, characterized in that the mixing member is a shell operated by means of a handle extending through the outer body in a substantially horizontal position, thus allowing the arrangement within this operable shell of another shell working as a distributor.

Other objects of the invention will be in part obvious and in part pointed out hereinafter.

In order that the invention and its mode of operation may be readily understood by persons skilled in the art I have in the accompanying illustrative drawing and in the detailed following description based thereon, set out several possible embodiments of the same.

Fig. 1 is a vertical section of the cock adapted to direct the tempered water towards the lower part, for instance, running to a bath.

Fig. 2 is a similar view showing the cock adjusted to direct the water towards the upper part, for instance, rising to a shower-bath.

Fig. 3 is a horizontal section of Fig. 1 on the line A—A.

Fig. 4 represents a perspective view of the whole cock.

Referring to the drawing, 1 is the outer body of the cock with the inlet 2 for the cold water and the inlet 3 for the hot water. An outlet 4 is provided for the distributed water, for instance, to feed a bath.

Inside of the body 1 is centered a shell 5 with the ports 6 and 6' disposed at an angle of approximately 135° with respect to one another. Owing to the arrangement of its ports, this shell permits either the entry of the hot water by moving only the handle 7 fully to the right side, or the entry of the cold water by bringing the said handle 7 to the middle of the guide slot 8, or, the entry of the tempered water when the handle 7 is positioned midway between the feeding positions of cold and hot water.

The cock is stopped by moving the handle up to the end of its guiding slot 8 on the left side.

The Fig. 3 shows clearly the above mentioned positions which are had by the single management of the shell 5.

Received within the shell 5 is another shell 9 provided with four ports 10, 11, 12, 13 arranged in pairs, the ports in each pair being diametrically opposed and each pair of ports being positioned at right angular relation and separated by a horizontal partition 14. In this manner the distributor is adjustable to feed either towards the lower part (bath) or the upper part (shower-bath) the cold water, hot water, or tempered water. The distributor is controlled by the handle 15 movable in the guide 16 of the outer body 1. This driving is therefore independent of that of the mixing shell 5.

According to Fig. 1, the shell 5 admits the cold water on the left side, and the hot water on the right side for the delivery of the tempered water towards the lower part. On the contrary, in Fig. 2, the distributor 9 having been displaced in order to bring its upper ports in correspondence with those of the shell 5, the tempered water is forwarded towards the upper part.

Whatever may be the position of the distributor 9 (upper or lower distribution), it will be possible to get a feed of either cold or hot water by adjusting the shell 5 only.

Having now described the object of this invention and in which manner same is to be performed, what I claim is:

1. A mixing and distributing cock comprising a pair of concentric shells disposed in direct contact with one another, an outer body enclosing said shells, a single cover for said body, an operating handle for each shell, one of said handles extending radially through the body and the other of said handles extending radially through the cover for said body 2. A mixing and distributing cock comprising a casing having its upper end opened, a pair of inlet ports communicating with said casing, an outlet port leading from the lower end of said casing, a pair of valves each consisting of a conical-shaped shell arranged concentrically and in nested formation within said casing, said valves having ports therein adapted at times to communicate with the ports of said casing, a cover connected to and enclosing the upper opened end of said casing, said cover having an outlet port therein adapted at times to communicate with the inlet ports of said casing, an operating handle extending radially through said casing and connected to one of said valves and another operating handle extending radially through said cover and connected to the other of said valves.

MICHEL THÉODORIDÉS.